US008373685B2

(12) United States Patent
Hsueh

(10) Patent No.: US 8,373,685 B2
(45) Date of Patent: Feb. 12, 2013

(54) DISPLAY SYSTEMS

(75) Inventor: Wei-Chieh Hsueh, Tainan (TW)

(73) Assignee: Wisepal Technologies, Inc., Miao-Li County (TW)

( * ) Notice: Subject to any disclaimer, the term of this patent is extended or adjusted under 35 U.S.C. 154(b) by 1093 days.

(21) Appl. No.: 11/877,698

(22) Filed: Oct. 24, 2007

(65) Prior Publication Data

US 2008/0100600 A1 May 1, 2008

(30) Foreign Application Priority Data

Oct. 26, 2006 (TW) ................................ 95139515 A

(51) Int. Cl.
*G06F 3/038* (2006.01)
*G09G 5/00* (2006.01)
*G09G 3/36* (2006.01)

(52) U.S. Cl. .......................................... 345/204; 345/99

(58) Field of Classification Search ............ 345/87–104, 345/204–215, 690–699; 257/299; 375/374; 327/148, 157, 536

See application file for complete search history.

(56) References Cited

U.S. PATENT DOCUMENTS

| | | | | |
|---|---|---|---|---|
| 5,373,310 | A * | 12/1994 | Ichimura et al. | 345/98 |
| 5,465,102 | A * | 11/1995 | Usui et al. | 345/89 |
| 2004/0095342 | A1 * | 5/2004 | Lee et al. | 345/211 |
| 2004/0183792 | A1 * | 9/2004 | Takada et al. | 345/204 |
| 2005/0110784 | A1 * | 5/2005 | Kang et al. | 345/204 |
| 2006/0133147 | A1 * | 6/2006 | Lee et al. | 365/185.18 |
| 2006/0267901 | A1 * | 11/2006 | Maekawa | 345/98 |
| 2011/0204963 | A1 * | 8/2011 | Kim | 327/536 |

* cited by examiner

*Primary Examiner* — Amare Mengistu
*Assistant Examiner* — Patrick F Marinelli
(74) *Attorney, Agent, or Firm* — McClure, Qualey & Rodack, LLP

(57) ABSTRACT

Driving methods for display panels are provided, in which a $K^{th}$ row of pixels in a pixel array is driven during a first period, and a $K+1^{th}$ row of pixels in the pixel array is driven during a second period. A control clock applied for a charge pump is toggled at least N times during a third period between the first and second periods, and the control clock is maintained at a fixed logic level during the first and second periods, in which N≧2.

16 Claims, 7 Drawing Sheets

DISPLAY SYSTEMS

BACKGROUND OF THE INVENTION

1. Field of the Invention

The invention relates to a display system, and in particular to a display system capable of preventing banks (non-uniform color), water waves and high frequency noise.

2. Description of the Related Art

Liquid crystal displays (LCDs) are used in a variety of applications, including calculators, watches, color televisions, computer monitors, and many other electronic devices. Active-matrix LCDs are a well known type of LCD. In a conventional active matrix LCD, each picture element (or pixel) is addressed using a matrix of thin film transistors (TFTs) and one or more capacitors. The pixels are arranged and wired in an array having a plurality of rows and columns.

To address a particular pixel, the switching TFTs of a specific row are switched "on" (i.e., charged with a voltage), and data voltage is sent to the corresponding column. Since other intersecting rows are turned off, only the capacitor at the specific pixel receives the data voltage charge. In response to the applied voltage, the liquid crystal cell of the pixel changes its polarization, and thus, the amount of light reflected from or passing through the pixel changes. In liquid crystal cells of a pixel, the magnitude of the applied voltage determines the amount of light reflected from or passing through the pixel.

Generally, boosting devices are required for LCDs in order to provide a higher voltage to drive display panels therein. Most commonly, a charge pump is used and voltages generated thereby control the magnitude of the respective gate line signal applied to each of gate line, the magnitude of the Vcom signal applied to the common electrode (COM), and the Gammar circuit to generate different gray values. Thus, a charge pump providing stable high voltage is important for high display quality.

BRIEF SUMMARY OF THE INVENTION

A detailed description is given in the following embodiments with reference to the accompanying drawings.

Embodiments of a driving method for display panels are provided, in which a $K^{th}$ row of pixels in a pixel array is driven during a first period, and a $K+1^{th}$ row of pixels in the pixel array is driven during a second period. A control clock applied for a charge pump is toggled at least N times during a third period between the first and second periods, and the control clock is maintained at a fixed logic level during the first and second periods, in which $N \geqq 2$.

The invention provides an embodiment of a driving method for display panels, in which a plurality rows of pixels in a pixel array is driven in sequence, a control clock applied for a charge pump is maintained to a fixed logic level when any of the rows of pixels is driven, and the control clock is toggled at least N times during every blank period when none of the rows of pixels is driven, in which $N \geqq 2$.

The invention also provides an embodiment of a display system for a panel displaying images. In the display panel, a pixel array comprises a plurality of pixels in a matrix, a plurality of scan lines and a plurality of data lines, a data driver coupled to the data lines, a scan driver coupled to the scan lines, and wherein the data driver and the scan driver drive rows of pixels in the pixel array in sequence. A voltage controller comprises at least one charge pump to generate at least one DC voltage applied to the data driver and the scan driver. A clock generator generates a control clock applied to the charge pump to generate the DC voltage accordingly and maintains the control clock at a fixed logic level when any of the rows of pixels is driven, and toggles the control clock at least N times during every blank period when none of the rows of pixels is driven, in which $N \geqq 2$.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
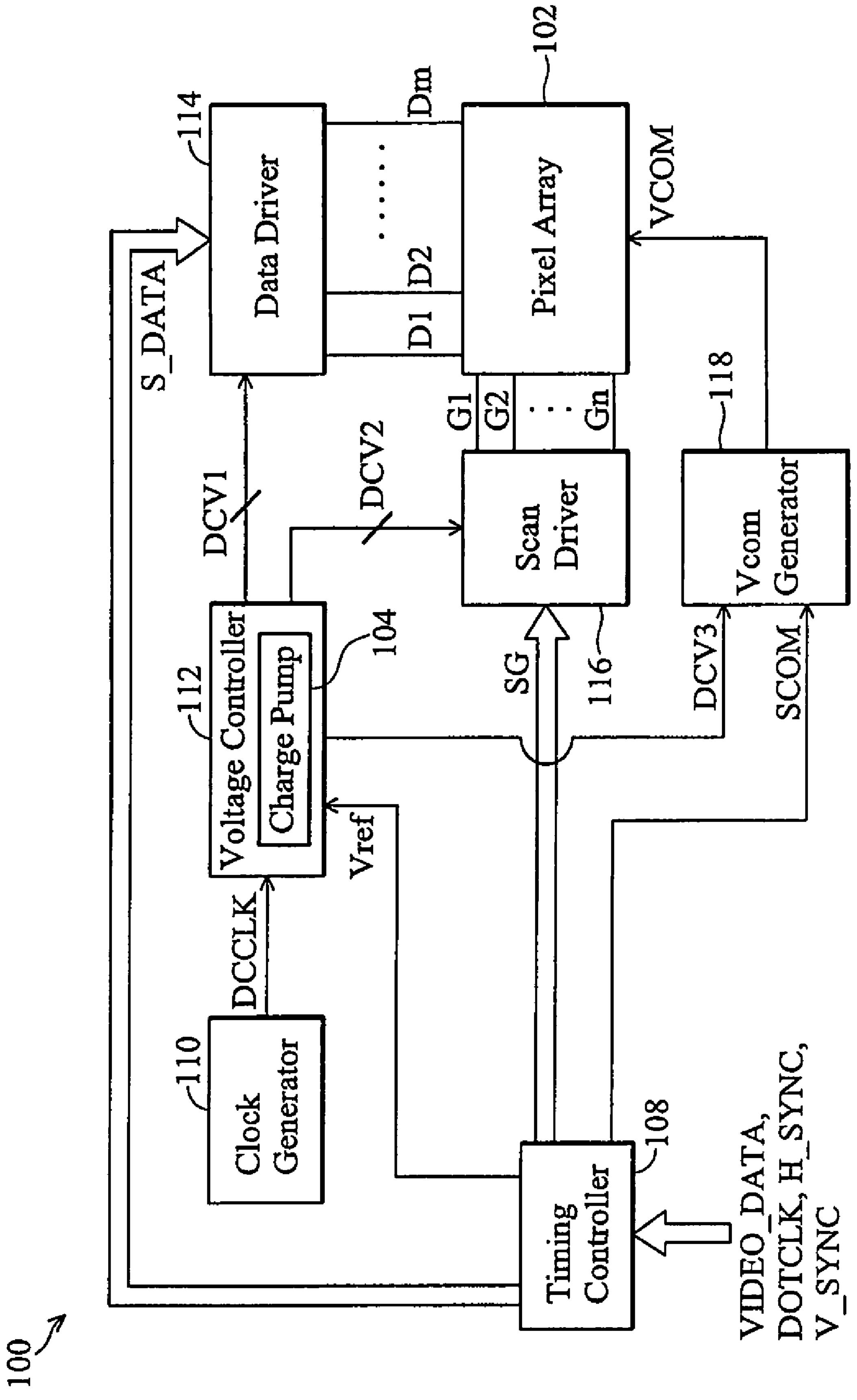
FIG. 1 shows an embodiment of a display panel.

FIG. 1 shows an embodiment of a display panel. As shown, display panel 100 comprises a pixel array 102, a timing controller 108, a clock generator 110, a voltage controller 112, a data driver 114, a scan driver 116 and a common voltage (Vcom) generator 118.

The pixel array 102 comprises a plurality of pixels arranged in a matrix (not shown), a plurality of scan lines G1~Gn, and a plurality of data lines D1~Dm, wherein the pixels are driven by the data driver 114 and the scan driver 116.

The timing controller 108 generates synchronized image data S_DATA to the data driver 114 according to image data VIDEO_DATA, a system control clock DOTCLK and a synchronization signal (H_SYNC and V_SYNC) from a graphic processor or a data processor, controlling timing of data signals generated by the data driver 114 and applied to data lines D1~Dm of the pixel array 102.

Similarly, the timing controller 108 generates scan signals SG to the scan driver 116 according to the system control clock DOTCLK and the synchronization signal (H_SYNC and V_SYNC) from the graphic processor or the data processor, controlling timing of scan signals generated by the scan driver 116 and applied to scan lines G1~Gn of the pixel array 102. Further, the timing controller 108 generates an initial common voltage SCOM to the Vcom generator 118 according to the system control clock DOTCLK from the graphic processor, controlling timing of a common voltage (Vcom) signal generated from the Vcom generator 118 and applied to a common electrode (not shown) of the pixel array 102.

The voltage controller 112 comprises at least one charge pump 104 to generate at least one direct current (DC) voltage. A typical charge pump used in a display panel generates a DC voltage, such as DCV1, DCV2 or DCV3) a multiple of a reference voltage (Vref) when pumped by a control clock signal (DCCLK). Examples of such charge pumps are disclosed in U.S. Patent Applicant Publication No. U.S. 2002/0044118 and U.S. Patent Applicant Publication No. U.S. 2003/0011586.

For example, the DC voltage DC1 can be generated by the voltage controller 112 for the data driver 114 to control the magnitude of the respective data line signal applied to each of the data lines D1~Dm. Similarly, the DC voltage DC2 is generated by the voltage controller 112 for the scan driver 116 to control the magnitude of the respective scan line signal applied to each of the scan lines G1~Gn. Further, the DC voltage DC3 is generated by the voltage controller 112 for the Vcom generator 118 to control the magnitude of the common voltage Vcom applied to the common electrode of the pixel array 102.

The clock generator 110 generates at least one control clock DCCLK to control at least one charge pump 104 (shown in FIG. 4) in the voltage controller 112, such that the DC voltage DCV1, DCV2 and DCV3 are generated.

Figure 2A:
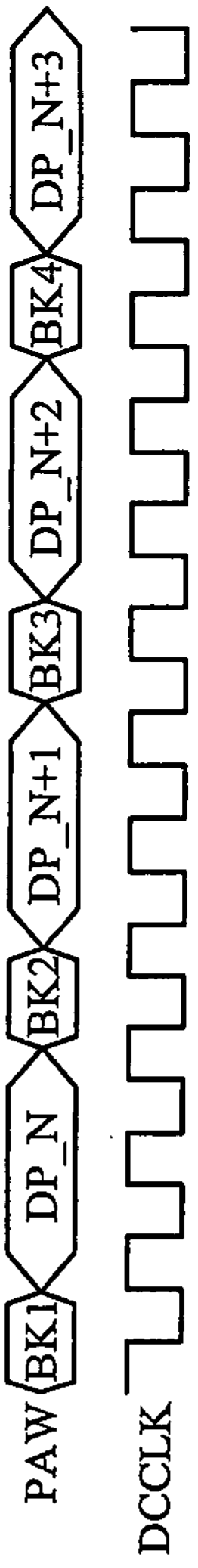
FIG. 2A shows a timing chart of a display panel.

FIG. 2A shows a timing chart of the display panel, presenting the relationship between the display wave PAW and the control clock DCCLK applied to the charge pump in the voltage controller 112. As shown, display periods DP_N, DP_N+1, DP_N+2 and DP_N+3 and blank periods BK1, BK2, BK3 and BK4 appear alternately. In the display periods DP_N, DP_N+1, DP_N+2 and DP_N+3, the data driver 114 and the scan driver 116 drive $N^{th}$ to $N+4^{th}$ rows of pixels in the pixel array 102 in sequence.

To generate required DC voltage, such as DC1, DC2 or DC3, by the charge pump in the voltage controller 112, the control clock DCCLK toggles several times, i.e., the voltage level of the clock DCCLK goes low from high or vice versa. However, because the control clock DCCLK is toggled during the display periods DP_N, DP_N+1, DP_N+2 and DP_N+3, non-uniform color (banks) or water waves can occur in the images. This is because the output voltage on the data lines of the data driver 114 is unstable during the display periods DP_N, DP_N+1, DP_N+2 and DP_N+3 but the control clock DCCLK is toggled at these time intervals.

Figure 2B:
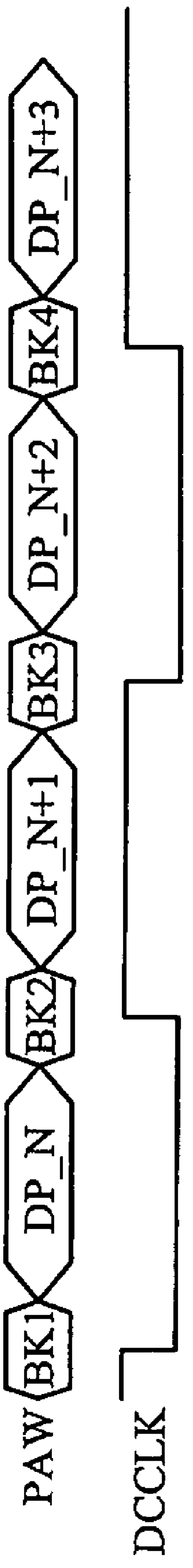
FIG. 2B shows another timing chart of a display panel.

FIG. 2B shows another timing chart of the display panel. In this embodiment, because the control clock DCCLK is not toggled in the display periods DP_N, DP_N+1, DP_N+2 or DP_N+3 but in the blank periods BK1, BK2, BK3 and BK4, non-uniform color (banks) or water waves are prevented. However, because frequency of the control clock DCCLK is too low, the DC conversion efficiency of the current in the charge pump of the voltage controller 112 is poor and noticeable noise is generated.

Figure 2C:
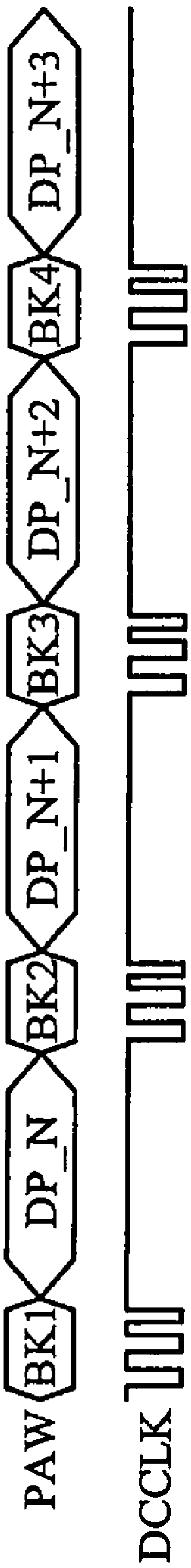
FIG. 2C shows another timing chart of a display panel.

In view of this, the invention further provides another display driving method. FIG. 2C shows another timing chart of the display panel, presenting the relationship between the display wave PAW and the control clock DCCLK applied to the charge pump in the voltage controller 112. As shown, display periods DP_N, DP_N+1, DP_N+2 and DP_N+3 and blank periods BK1, BK2, BK3 and BK4 appear alternately.

In the display periods DP_N, DP_N+1, DP_N+2 and DP_N+3, the data driver 114 and the scan driver 116 drive $N^{th}$ to $N+4^{th}$ rows of pixels in the pixel array 102 in sequence. For example, during the display period DP_N, the scan driver 116 scan the $N^{th}$ scan line, such as G2, according to the scan control signal SG from the timing controller 108 and the data driver 114 provide corresponding data on the data lines D1~Dm of the pixel array 102 according to the synchronized image data S_DATA from the timing controller 108. Namely, the $N^{th}$ row of pixels in the pixel array 102 are driven. Similarly, the $N+1^{th}$ to $N+3^{th}$ rows of pixels in the pixel array 102 are driven in sequence during the display periods DP_N+1, DP_N+2 and DP_N+3, and operations of those are similar to that of the $N^{th}$ row of pixels and thus, are omitted for simplification. During the blank periods BK1~BK4, all scan lines G1~Gn are not activated (scanned), i.e., the image data of the pixels are not updated in these time intervals.

In this embodiment, the clock generator 110 quickly toggles the control clock DCCLK only during the blank periods BK1, BK2, BK3 and BK4 and maintains the control clock DCCLK at a logic high without being toggled during the display periods DP_N, DP_N+1, DP_N+2 and DP_N+3. Thus, not only are non-uniform color (banks) or water waves prevented but also poor DC conversion efficiency and noticeable noise.

Figure 2D:
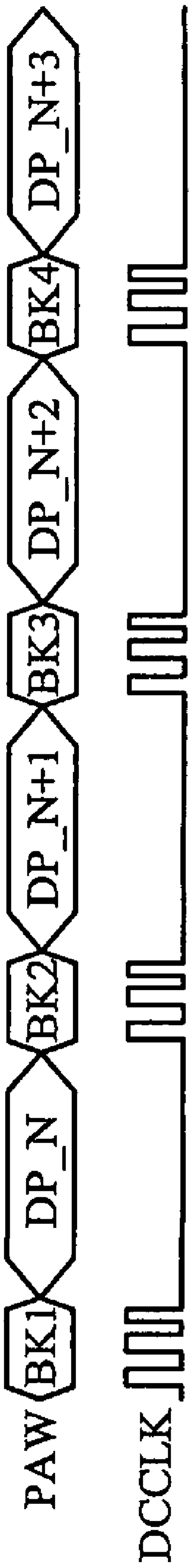
FIG. 2D shows another timing chart of a display panel.

FIG. 2D shows another timing chart of the display panel. Similarly, the clock generator 110 quickly toggles the control clock DCCLK only during the blank periods BK1, BK2, BK3 and BK4 and does not toggle during the display periods DP_N, DP_N+1, DP_N+2 and DP_N+3. In this embodiment, during the display periods DP_N, DP_N+1, DP_N+2 and DP_N+3, the control clock DCCLK is maintained at a low logic level rather than a high logic level as shown in FIG. 2C.

Figure 2E:
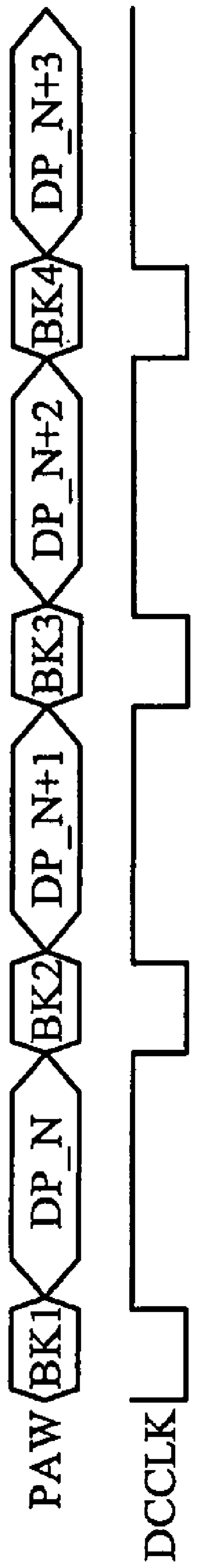
FIG. 2E shows another timing chart of a display panel.

FIG. 2E shows another timing chart of the display panel. Similarly, the clock generator 110 does not toggle the control clock DCCLK during the display periods DP_N, DP_N+1, DP_N+2 and DP_N+3. The clock generator 110 toggles the control clock DCCLK twice during the blank periods BK1, BK2, BK3 and BK4 and maintains the control clock DCCLK at a high logic level. It should be noted that frequency of the control clock preferably exceeds 20 KHz, such that noticeable noise can be prevented.

Figure 3:
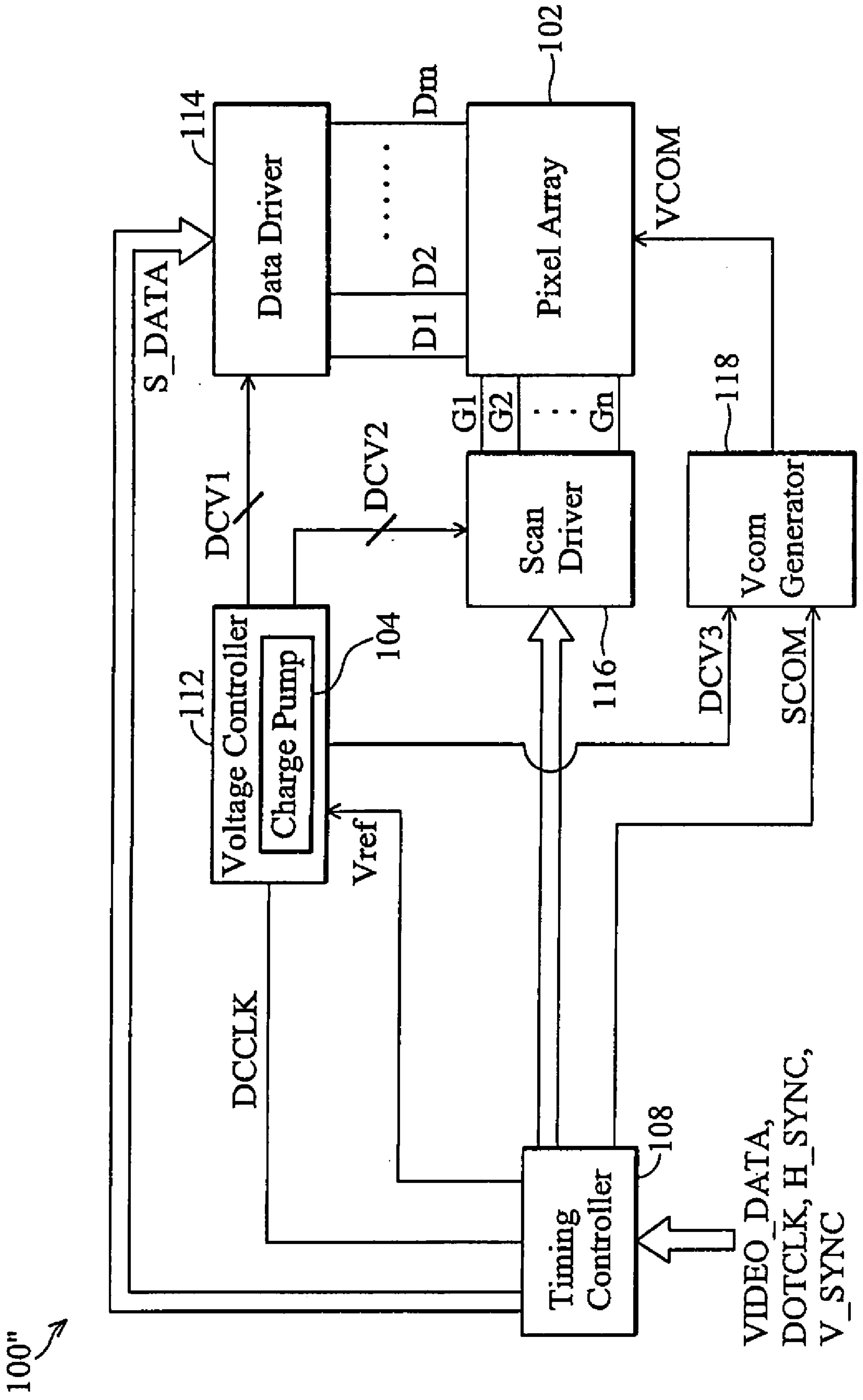
FIG. 3 shows another embodiment of a display panel.

FIG. 3 shows another embodiment of display panel in a display system. As shown, the display panel 100" is similar to the panel 100 in FIG. 1, differing only in that the control clock DCCLK for the charge pump in the voltage controller 112 is generated by the timing controller 108 directly rather an additional clock generator (as shown in FIG. 1).

Figure 4:
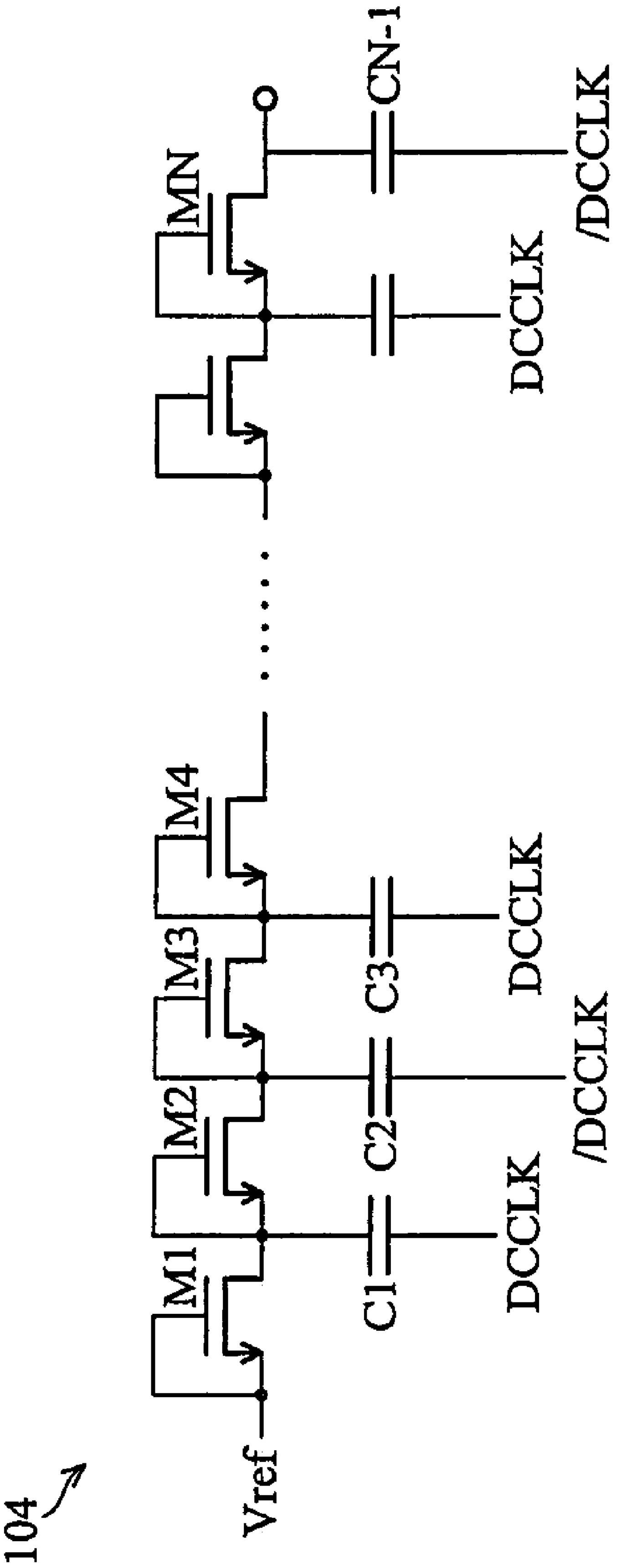
FIG. 4 shows an embodiment of a charge pump.

FIG. 4 shows an embodiment of charge pump. As shown, the charge pump 104 comprises a plurality of MOS transistors M1~MN connected in series and capacitors C1~CN−1. For example, the transistor M1 can comprise a first terminal coupled to the reference voltage Vref from the timing controller 108, a second terminal coupled to a capacitor C1 and a control terminal coupled to the first terminal thereof. The transistor M2 comprises a first terminal coupled to the second terminal of the transistor M1, a second terminal coupled to a capacitor C2 and a control terminal coupled to the first terminal thereof, and so on. However, the transistor MN comprises a first terminal coupled to the second terminal of the previous transistor, a second terminal serving as an output terminal and a control terminal coupled to the first terminal thereof. Further, the odd-numbered capacitors, such as C1, C3, . . . , are coupled to the control clock DCCLK from the clock generator 110 or the timing controller 108 and the even-numbered capacitors, such as C2, C4, . . . , are coupled to an inversion signal of the control clock DCCLK. By toggling the control clock DCCLK, the charge pump 104 can boost the reference voltage Vref to a desired DC voltage, such as DCV1, DCV2 or DCV3, for output to the data driver 114, the scan driver 116 and the Vcom generator 118. The charge pump 104 shown in FIG. 4 is an example and the disclosure is not limited thereto, with examples of such charge pumps disclosed in U.S. Patent Applicant Publication No. U.S. 2002/0044118 and U.S. Patent Applicant Publication No. U.S. 2003/0011586.

Figure 5:
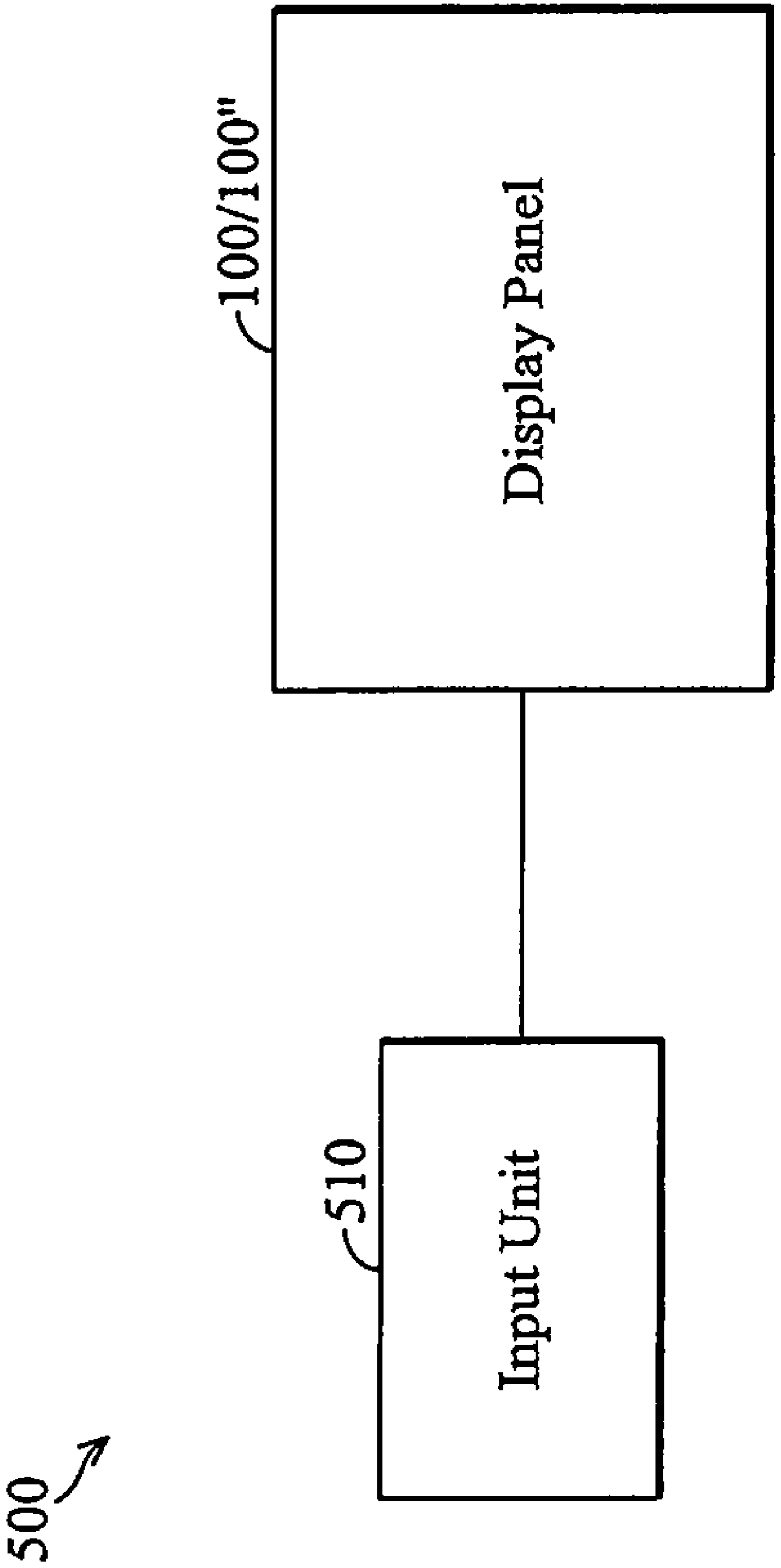
FIG. 5 shows an embodiment of a display system.

FIG. 5 shows an embodiment of a display system implemented in an electronic device. As shown, the electronic device 500 comprises a display panel, such as the display panel 100 or 100" and an input unit 510 coupled to the display panel 100/100" for providing input signals such that to the display panel 100/100" displays images. For example, the display panel 100/100" can be a liquid crystal display panel, an original light emitting display panel, field emission display panel or a plasma display panel, but is not limited thereto. The electronic device can be a digital camera, a portable DVD, a television, a car display, a PDA, a display monitor, a notebook computer, a tablet computer, or a cellular phone.

While the invention has been described by way of example and in terms of preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A driving method for display panels, comprising:

driving a $K^{th}$ row of pixels in a pixel array during a first period, wherein K is an integer greater than or equal to 1;

driving a $K+1^{th}$ row of pixels in the pixel array during a second period;

toggling a control clock at least N times during a third period between the first and second periods in order to control voltage boosting of a charge pump, in which $N \geqq 2$; and maintaining the control clock at a fixed logic level during the first and second periods; and wherein the third period comprises a blank period between two display periods.

2. The driving method as claimed in claim 1, wherein the control clock is maintained at a high logic level during the first and second periods.

3. The driving method as claimed in claim 1, wherein the control clock is maintained at a low logic level during the first and second periods.

4. A driving method for display panels, comprising:

driving a plurality rows of pixels in a pixel array in sequence;

maintaining a control clock applied for a charge pump to a fixed logic level when any of the rows of pixels is driven; and toggling the control clock at least N times during every blank period when none of the rows of pixels is driven in order to control voltage boosting of a charge pump, in which $N \geqq 2$.

5. The driving method as claimed in claim 4, wherein driving each row of pixels comprises:

scanning a corresponding scan line on the pixel array; and providing corresponding display signals on a plurality data lines of the pixel array.

6. The driving method as claimed in claim 5, wherein the control clock is maintained at a high logic level during the first and second periods.

7. The driving method as claimed in claim 5, wherein the control clock is maintained at a low logic level during the first and second periods.

8. A display system, comprising:

a display panel displaying images comprising:

a pixel array comprising a plurality of pixels in a matrix, a plurality of scan lines and a plurality of data lines;

a data driver coupled to the data lines;

a scan driver coupled to the scan lines, the data driver and the scan driver driving rows of pixels in the pixel array in sequence;

a voltage controller comprising at least one charge pump to generate at least one DC voltage applied to the data driver and the scan driver; and a clock generator generating a control clock applied to the charge pump to generate the DC voltage accordingly, in which the clock generator maintains the control clock to a fixed logic level when any of the rows of pixels is driven, and toggles the control clock—at least N times during every blank period when none of the rows of pixels is driven in order to control voltage boosting of a charge pump, in which $N \geqq 2$.

9. The display system as claimed in claim 8, wherein the control clock is maintained at a high logic level when any of the rows of pixels is driven.

10. The display system as claimed in claim 8, wherein the control clock is maintained at a low logic level when any of the rows of pixels is driven.

11. The display system as claimed in claim 10, wherein the clock generator comprises an oscillation circuit.

12. The display system as claimed in claim 11, further comprising a timing controller generating corresponding control signals to the data driver and the scan driver according to image data, a system control clock and a synchronization signal from a graphic processor or a data processor.

13. The display system as claimed in claim 8, wherein the clock generator is a timing controller.

14. The display system as claimed in claim 8, wherein the display panel is a liquid crystal display panel, an original light emitting display panel, field emission display panel or a plasma display panel.

15. The display system as claimed in claim 14, further comprising an electronic device, wherein the electronic device comprises:

the display panel; and an input device coupled to the display panel, providing an input signal to the display panel such that the display panel displays images.

16. The display system as claimed in claim 15, wherein the electronic device is a digital camera, a portable DVD, a television, a car display, a PDA, a display monitor, a notebook computer, a tablet computer, or a cellular phone.

* * * * *